L. H. EGGERT.
FASTENING MEANS.
APPLICATION FILED OCT. 18, 1916.

1,225,420.

Patented May 8, 1917.

Inventor:
Louis H. Eggert
by Davis & Simms
his attorneys

UNITED STATES PATENT OFFICE.

LOUIS H. EGGERT, OF ROCHESTER, NEW YORK, ASSIGNOR TO BASTIAN BROTHERS CO., OF ROCHESTER, NEW YORK, A CORPORATION OF NEW YORK.

FASTENING MEANS.

1,225,420.     Specification of Letters Patent.     Patented May 8, 1917.

Application filed October 18, 1916. Serial No. 126,309.

*To all whom it may concern:*

Be it known that I, LOUIS H. EGGERT, a citizen of the United States, and resident of Rochester, in the county of Monroe and State of New York, have invented certain new and useful Improvements in Fastening Means, of which the following is a specification.

The present invention relates to fastening means and more particularly to the type in which two members each carry part of the fastening means, the parts being so constructed that the members may be connected by pressing them together but cannot be disconnected without the destruction of the fastening means, an object of this invention being to provide a construction which is simple and inexpensive to manufacture and strong and durable in use.

To this and other ends, the invention consists of certain parts and combinations of parts all of which will be hereinafter described, the novel features being pointed out in the appended claims.

In the drawings:—

Figure 1:
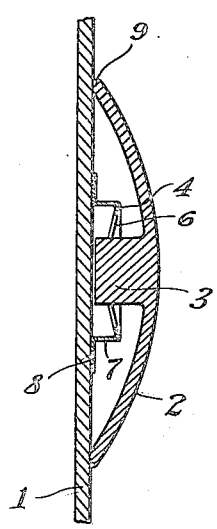
Figure 1 is an axial section of two members connected together by the present fastening means.
Figure 2:
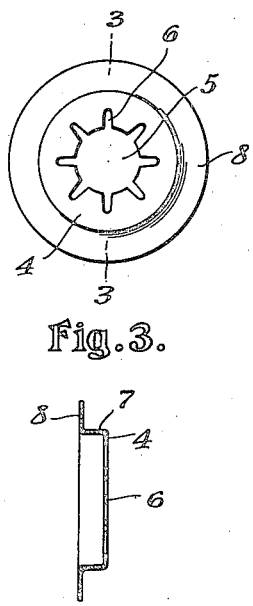
Fig. 2 is a plan view of one of the parts of the fastening means.

Referring more particularly to the embodiment shown in Figs. 1 to 4, 1 indicates one member and 2 the other member which are to be connected together. In this embodiment the member 2 is in the form of a concavo-convex disk while the member 1 is a wall of sheet material. The member 2 has a central cylindrical projection, the effective portion of which is uniform in cross-sectional area throughout its length, the length of said projection being less than the greatest depth of the concave face of the member 2. The member 1 carries a sheet metal wall 4 of less thickness than the effective length of the projection, and having an opening 5 conforming substantially in shape to a cross-sectional area of the effective portion of the projection 3 but being slightly smaller in diameter than the diameter of said projection. In order to render the wall of the opening yieldable in a direction transversely of the plane of the sheet wall but unyielding in the direction of said plane, the wall is provided with slits 6 preferably radiating from said opening 5 to provide tongues between them. In this instance, the wall 4 is supported at its outer edge by a cylindrical portion 7 from which an annular flange 8 projects laterally and is raised or otherwise secured to the member 1.

Figure 4:
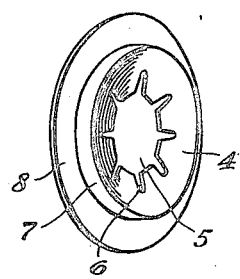
Fig. 4 is a perspective view showing the manner in which the part of the fastening means becomes distorted after the connection of the two members.
Figure 3:
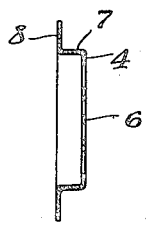
Fig. 3 is a section on the line 3—3, Fig. 2.

With this construction, when the projection 3 on the member 2 is forced into the opening 5, it causes the wall of the opening 5 to yield in a direction transverse of the sheet metal wall 4 in the manner shown in Figs. 1 and 4. The projection is carried through the opening 5 until the flange 9 of the concavo-convex member 2 abuts the member 1. Because of this abutment, it is impossible to engage the member 2 for the purpose of withdrawing the latter from the member 1 without the use of an instrument and such force as would tend to destroy the wall 4, because the wall of the opening 5 will not yield in the direction of the plane of the wall.

Figure 5:
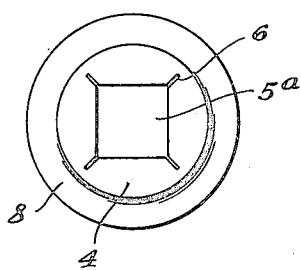
Fig. 5 is a plan view of part of another embodiment of the invention.
Figure 6:
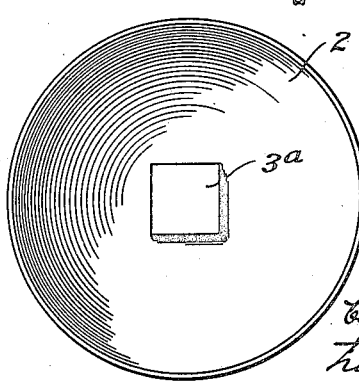
Fig. 6 is a rear view of the member which coöperates with the fastening means part shown in Fig. 5.

In the embodiment shown in Figs. 5 and 6, the parts are the same as shown in Figs. 1 to 4, except that the projection 3ª is square instead of round, and the opening 5ª in the wall 4 is likewise square. With this construction, it is impossible to turn the member 2 relatively to the wall 4.

Figure 7:
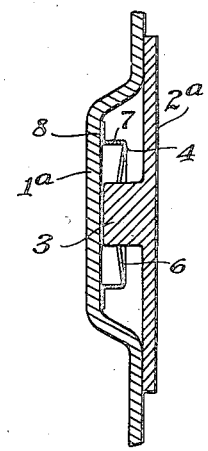
Fig. 7 is a sectional view of still another embodiment in which the member which carries the projection is flat while that which carries the locking wall is concaved.

In the embodiment shown in Fig. 7, the parts are the same as in Figs. 1 to 4, except that the member 2ª is flat while the member 1ª is concaved. The projection 3, in this instance, will be of less length than the greatest depth of the concaved portion of the member 1ª.

Figure 8:
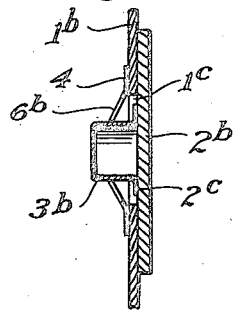
Fig. 8 is a sectional view of another embodiment of the invention.

In the embodiment shown in Fig. 8, the member 1ᵇ has an opening 1ᶜ and the wall 4 is secured on the rear face of the member being in the form of a disk. The member 2ᵇ is a flat plate and the rigid projection 3ᵇ is stamped from sheet metal and is secured to the rear face of the member 2ᵇ so as to project through the opening 1ᶜ and the opening in the wall 4, the coöperation between the projection and the wall being substantially the same as in the other embodiments.

In all embodiments of the invention, the members are fitted together by introducing the projection 3, 3ᵃ, or 3ᵇ into the opening 5 or 5ᵃ and pressing the two members together until they are brought into contact. This causes the wall of the opening 5 or 5ᵃ to yield inwardly so that if an attempt is made to withdraw the projection 3, 3ᵃ or 3ᵇ, the wall of the opening 5 or 5ᵃ will bind firmly against the projection 3, 3ᵃ or 3ᵇ and prevent such removal unless such force is used as will destroy the wall 4.

The present invention provides a simple and inexpensive means for fastening name plates on to the walls of radiators of automobiles. It is apparent, however, that the invention may be used at any place where it is desired to secure two members together against accidental removal.

What I claim as my invention and desire to secure by Letters Patent is:

1. The combination with a rigid wall and a device attached thereto, and abutting said wall, of fastening means between said two members surrounded by said abutting portions and comprising a rigid projection on one of said members, having an effective portion uniform in cross-sectional area throughout its length, a wall of sheet material on the other member of less thickness than the effective length of the projection, said wall having an opening conforming substantially in shape to a cross-sectional area of the effective portion of the projection but being slightly smaller in size than said cross-sectional area, the wall of said opening being slightly yieldable in a direction transverse of the sheet wall and being unyielding in the direction of the plane of the sheet wall.

2. The combination with a rigid wall, and a device attached thereto and abutting said wall, one of said members having a concavity surrounded by said abutting portions, of fastening means between said members arranged in said concavity and comprising a rigid projection secured to one of the members having an effective portion uniform in cross-sectional area throughout its length, a wall of sheet material secured to the other part and having less thickness than the effective length of the projection, said wall having an opening conforming substantially in shape to a cross-sectional area of the effective portion of the projection but being slightly smaller in size than said cross-sectional area, the wall of said opening being slightly yieldable in a direction transverse of the sheet wall and being unyielding in the direction of the plane of the wall, said projection and wall being contained within the concavity.

3. Fastening means between two members comprising a rigid projection on one of said members, having an effective portion uniform and noncircular in cross-sectional area throughout its length, a wall of sheet material on the other member of less thickness than the effective length of the projection, said wall having a noncircular opening conforming substantially in shape to a cross-sectional area of the effective portion of the projection but being slightly smaller in size than said cross-sectional area.

4. The combination with a rigid wall and a device attached thereto and abutting said wall, of fastening means between said two members surrounded by said abutting portions and comprising a rigid projection on one of said members, having a portion uniform in cross-sectional area throughout its length, a wall of sheet material on the other member of less thickness than the effective length of the projection, said wall having an opening conforming substantially in shape to a cross-sectional area of the effective portion of the projection but being slightly smaller in size than said cross-sectional area, the sheet wall being provided with radial openings so that the wall of the opening is slightly yieldable in a direction transverse of the sheet wall and is unyielding in the direction of the plane of the sheet wall.

LOUIS H. EGGERT.